United States Patent [19]

Liu

[11] Patent Number: 5,898,419
[45] Date of Patent: Apr. 27, 1999

[54] METHOD AND APPARATUS FOR SCALING A CURSOR ON LOCAL COMPUTER TO HAVE THE SAME SIZE RELATIVE TO A WINDOW ON THE LOCAL COMPUTER AS ANOTHER CURSOR HAS TO ANOTHER WINDOW ON A REMOTE COMPUTER

[75] Inventor: David Ying Wai Liu, Eastleigh, United Kingdom

[73] Assignee: International Business Machines Corp., Armonk, N.Y.

[21] Appl. No.: 08/750,432

[22] PCT Filed: Oct. 6, 1995

[86] PCT No.: PCT/GB95/02374

§ 371 Date: Dec. 9, 1996

§ 102(e) Date: Dec. 9, 1996

[87] PCT Pub. No.: WO96/35164

PCT Pub. Date: Nov. 7, 1996

[30]   Foreign Application Priority Data

May 3, 1995 [GB] United Kingdom ............ 9509006

[51] Int. Cl.[6] .................................................. G06F 3/14
[52] U.S. Cl. ................................................................ 345/127
[58] Field of Search ................................. 345/329, 330, 345/331, 332, 145, 146, 127, 128, 129, 130, 131; 395/200.34, 200.35

[56]   References Cited

U.S. PATENT DOCUMENTS

| 4,896,148 | 1/1990 | Kurita ............................. 340/731 |
| 5,526,018 | 6/1996 | Fisher ............................. 345/127 |
| 5,710,897 | 1/1998 | Schneider ....................... 395/334 |
| 5,771,036 | 6/1998 | Martin et al. .................... 345/145 |
| 5,774,111 | 6/1998 | Lecland et al. .................. 345/145 |

*Primary Examiner*—Lance Leonard Barry
*Attorney, Agent, or Firm*—A. Bruce Clay

[57]   ABSTRACT

A first computer workstation 810 is linked to a second computer workstation 820. A window 812 which is displayed at the first computer workstation is copied to a window 822 at the second computer workstation. A hook procedure is used to intercept movement of the cursor 814 at the first workstation. These movements are then transmitted together with a representation of the cursor image over the link from the first computer to the second computer. The cursor image is then displayed 824 at the second terminal in the corresponding position as at the first terminal. The size of the cursor image is scaled so that cursor 824 has the same size relative to window 822 as cursor 814 as to window 812.

19 Claims, 7 Drawing Sheets

METHOD AND APPARATUS FOR SCALING A CURSOR ON LOCAL COMPUTER TO HAVE THE SAME SIZE RELATIVE TO A WINDOW ON THE LOCAL COMPUTER AS ANOTHER CURSOR HAS TO ANOTHER WINDOW ON A REMOTE COMPUTER

TECHNICAL FIELD OF THE INVENTION

The present invention relates to systems in which a computer workstation is linked to a remote workstation, such that an image which is displayed at the remote computer workstation may also be displayed at the computer, and more particularly to a system in which the remote workstation also supports a cursor which is movable across the image.

BACKGROUND OF THE INVENTION

In recent years it has become increasingly common to connect personal computers or workstations together into networks so that different machines can communicate with one another. These links allow collaborative working, in which two or more users at different machines work simultaneously and in combination on a single application (eg a spreadsheet). This application is typically running at just a single machine, but its output is displayed at one or more other workstations, so that multiple users can interact with the application. An example of such a collaborative working system for UNIX workstations is described in EPA 475581. Such systems are sometimes referred to as groupware.

EPA 590817 describes a collaborative working system in which a screen on a first workstation at a location is shared or mirrored on a second workstation at a different location. EPA 590817 operates by effectively intercepting graphics calls to the screen at the first workstation, and determining the region of screen that is being updated by the call. The modified region of the screen is then accessed and transmitted to the second workstation, where it is superimposed on the mirrored window.

U.S. Pat. No. 5,241,625 also discloses a screen-sharing mechanism. Again graphics calls are intercepted, but it is these calls that are transmitted to the second workstation rather than data representing updated regions of the screen. These calls are then processed at the second workstation to perform the same screen update as at the first workstation. U.S. Pat. No. 5,241,625 sends cursor position commands from the first workstation to the second workstation.

EPA 645725 describes a system in which a cursor is copied from a host workstation to a remote workstation. The remote user sees a "pseudo" cursor (from the host), in addition to his or her own true cursor. When the cursor changes shape at the host workstation, a corresponding change is effected at the remote workstation, typically by using the SetCursor command. GB 2282944 also describes a conferencing system which provides remote display of objects and cursor movements.

Note that the cursor is often regarded as being in a different plane from the main screen image. As a result of this, in a screen sharing environment the cursor may be handled somewhat separately from the main screen image, and this can lead to anomalies in the shared display presented to the user at the second location.

SUMMARY OF THE INVENTION

Accordingly, the invention provides a method of operating a local computer workstation, linked to a remote computer workstation, wherein an image which is displayed at the remote workstation is also displayed at the local workstation, the remote workstation supporting a cursor which is movable across the image, the method comprising the steps, performed by the local workstation, of:

receiving information from the remote workstation indicating the cursor position relative to the image at the remote workstation;

scaling a cursor representation at the local workstation in accordance with the ratio of the sizes of the image as displayed at the local and remote workstations; and applying the scaled cursor representation to its indicated position in the image at the local workstation.

Scaling the cursor so that it has the same size relative to the image at both the local and remote workstations has been found to provide a more natural and effective interface for users cooperating at different machines. In particular, problems are avoided if one of the users attempts to indicate a position with a cursor in a slightly unorthodox manner (eg with the tail rather than the head of a cursor arrow), since the compatible scaling helps to ensure that these positions will match across the two images.

In order to maintain this correct scaling, it is preferred that in response to detecting that the image at the local workstation has been resized, the method further comprises the steps of: re-scaling the cursor representation at the local workstation in accordance with re-sized image;

and applying the re-scaled cursor representation to the image at the local workstation.

Typically the cursor representation at the local workstation will not be the true cursor at the local workstation, but rather an image or simple representation of a cursor. It would in theory be possible to call the relevant operating system functions to scale the true cursor (subject to operating system restrictions on the size of the true cursor). However, this can be very awkward from a usability point of view, for example if the user at the local workstations wants to make their own cursor movement, since now the cursor would be under dual control. In practice therefore it is much better to display a simple cursor image at the local workstation, and leave the true cursor at the local terminal under full control of the user there.

As a consequence of using a cursor image rather than manipulating the true cursor, in the preferred embodiment, prior to applying the cursor representation to its updated position, a portion of the image corresponding to the updated position is saved. Then, on receipt of the next updated cursor position, the cursor representation is deleted from this position by reapplying the saved portion of the image to its original position. In this manner the now outdated cursor is overwritten by the saved image portion, thereby restoring the image to its original form (without any cursor displayed), before the application of the cursor in its new position. Saving the appropriate image portion is a simple way of ensuring that it can be restored subsequently if the cursor is moved. In some situations it may be possible to arithmetically recover the overwritten portion of the image directly from the displayed image (ie image plus cursor), and a knowledge of the cursor itself. However, this may require additional processing, and may not be possible for some cursor implementations, dependent on the particular function used to generate the displayed image from the cursor and original image.

Typically, the image comprises a rectangular window, and the scaling may be performed independently in the x and y directions.

In a preferred embodiment, a representation of the cursor at the remote workstation is received and used as the basis for the cursor representation at the local workstation. For example, if the remote cursor is a single-headed arrow, this image is transmitted and used at the local workstation, similarly if the remote cursor is a double-headed arrow. An alternative might simply be to use a standard cursor image at the local workstation, and scale this accordingly. Although this would certainly be feasible, given that the size of cursors is fairly standard for a given operating system, it is less informative for the users and the inconsistency in cursor shape may lead to misunderstandings. In the preferred embodiment, the remote cursor shape is monitored, and any change to the cursor shape transmitted to the local workstation.

Because the local workstation uses a representation of the cursor at the remote workstation, in the preferred embodiment a bit map is created from the the received cursor representation. This bit map can then be readily applied directly onto the image at the local workstation.

The invention also provides a computer workstation, which in operation may be linked to a remote computer workstation, such that an image which is displayed at the remote workstation is also displayed at the workstation, the remote workstation supporting a cursor which is movable across the image, said workstation including:

- means for receiving information from the remote workstation indicating the cursor position relative to the image at the remote workstation;
- means for scaling a cursor representation in accordance with the ratio of the size of the image displayed at the workstation to the size of the image displayed at the remote workstation; and
- means for applying the scaled cursor representation to its indicated position in the image.

BRIEF DESCRIPTION OF THE DRAWINGS

For a more complete understanding of the present invention and for further advantages thereof, reference is now made to the following Detailed Description, taken in conjunction with the accompanying drawings, in which.

DETAILED DESCRIPTION OF THE INVENTION

Figure 1:
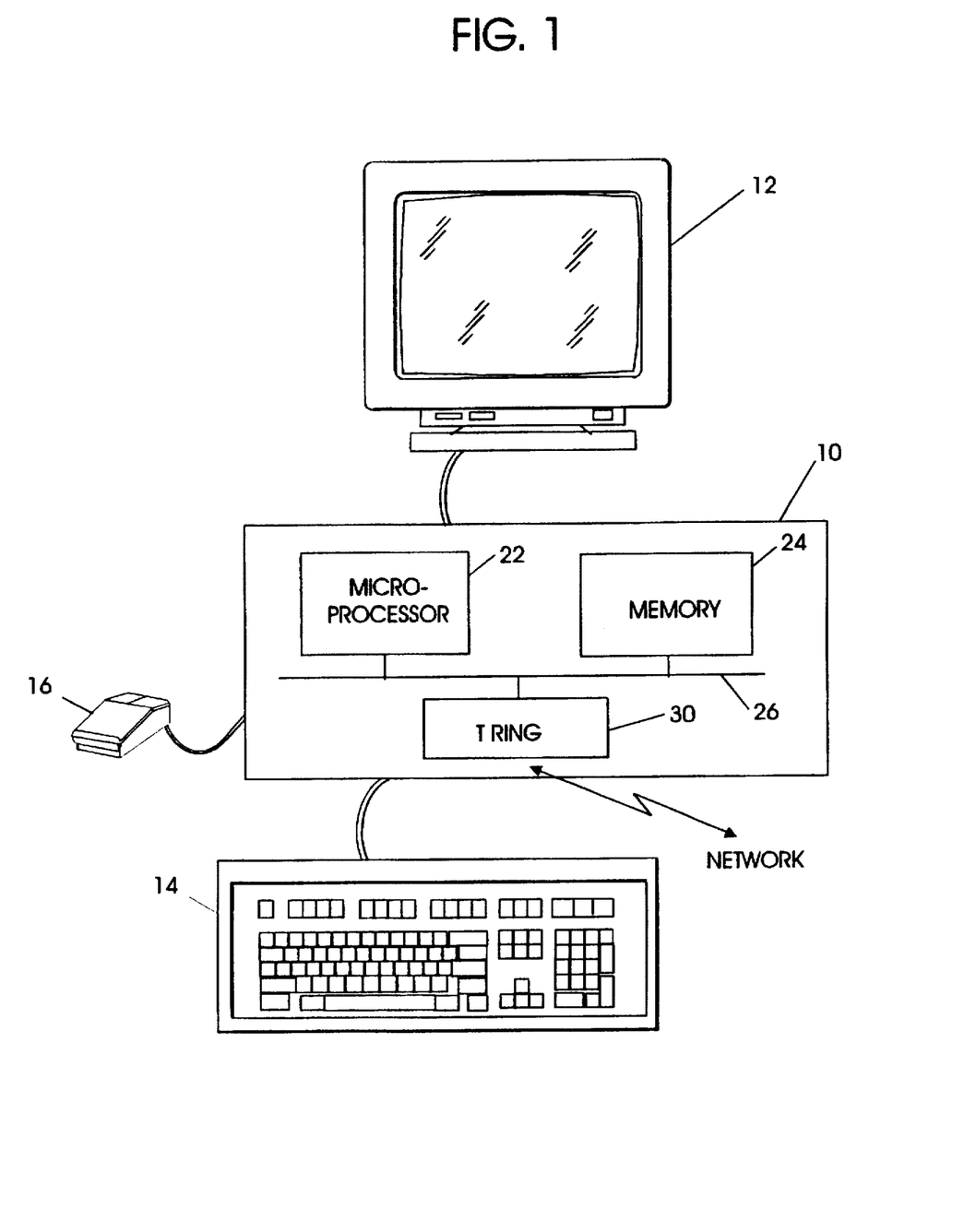
FIG. 1 is a schematic diagram of a conventional computer workstation.

FIG. 1 is a simplified schematic diagram of a computer system, with a system unit 10, a display screen 12, a keyboard 14 and a mouse 16. The system unit 10 includes microprocessor 22, semi-conductor memory (ROM/RAM) 24, and a bus over which data is transferred 26. The computer of FIG. 1 may be any conventional workstation, such as a PC computer available from IBM Corporation. The computer of FIG. 1 is equipped with a network adapter card 30. This card, together with the accompanying software, allows messages to be transmitted from and received by the computer workstation. Various forms of network adapter card are available for use with different networks, such as Token Ring, Ethernet, ISDN, and so on. The operation of the network adapter card is well-known and so will not be described in detail.

Figure 2:
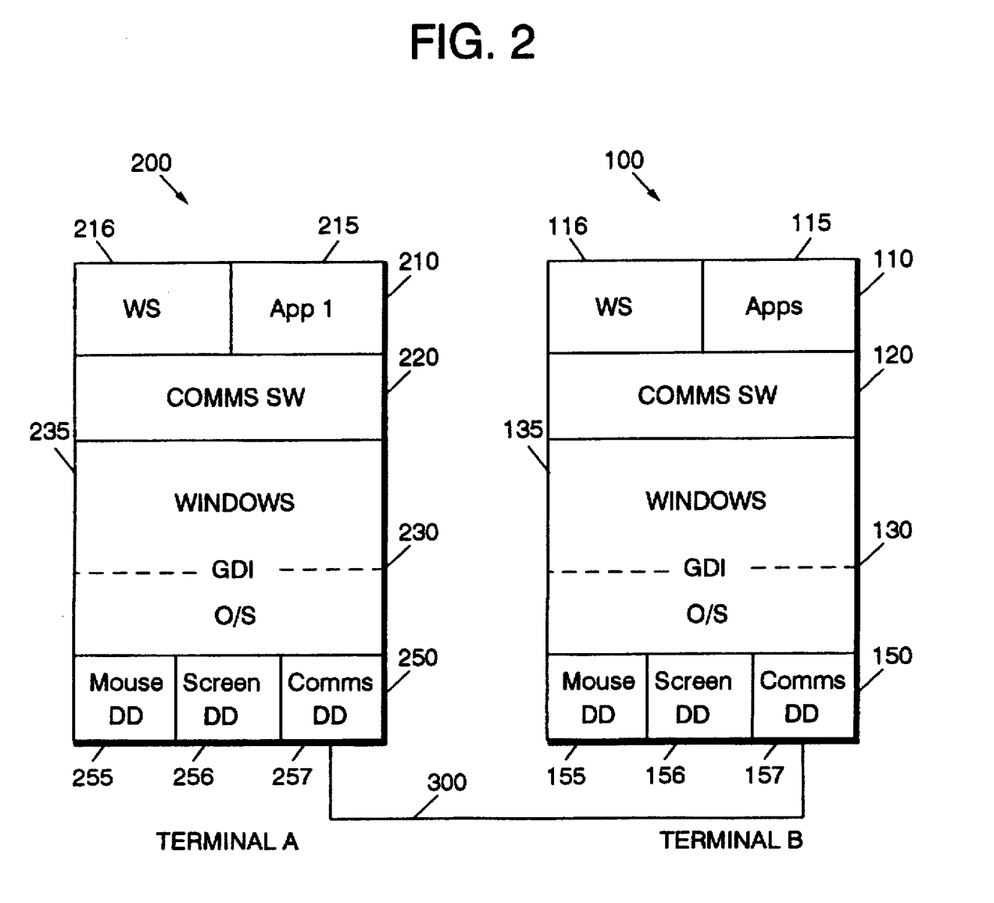
FIG. 2 illustrates the main software components that are required on two workstations in order to provide window sharing.

FIG. 2 illustrates the main software components on two terminals, A and B that are involved in a window sharing session. Each terminal represents a computer workstation 100, 200 as illustrated in FIG. 1, and runs the Windows operating system 130, 230, available from Microsoft Corporation (strictly speaking of course, the operating system is DOS with Windows running on top of it, but this distinction is not relevant for the present invention). More details about the Windows system can be found in "Programming Windows" by Charles Petzold, from Microsoft Press.

Below the operating systems are device drivers 150, 250, which control interactions between the operating system and external devices attached to the computer. Three particular device drivers are illustrated for each workstation. The first is the mouse device driver 155, 255, which passes to the operating system information received from the mouse 16 relating to location of the mouse, and which buttons are being pushed. The screen device driver 156, 256 is used by the operating system to display images on the display screen 12. Finally the communications device driver 157, 257 is used as an interface between the operating system and the network adapter card 30.

It will be appreciated that device drivers are well-known in the art, and so will not be described in further detail. Similarly, there may well be other device drivers (eg one relating to the keyboard 14), but these have been omitted since they are not directly relevant for an understanding of the present invention.

Each terminal also includes communications software 120, 220, which allows messages to be transmitted over link 300 between the computers (via the communications device drivers). Again, such messaging software is well-known in the art, and so will not be described further. Lastly, there are applications 110, 210 running at each workstation. One particular application, illustrated as WS 116, 216, provides a window sharing facility, whereby a window from one of the computer workstations in FIG. 2 may be copied to and remotely displayed at the other workstation. For present purposes, we shall assume that the window of App1 215 at terminal A is being shared with terminal B. Note that there may also be applications (Apps) 115 other than WS active at terminal B, and also possibly other applications (not shown) at terminal A, but these are not directly relevant to an understanding of the present invention.

Figure 3:
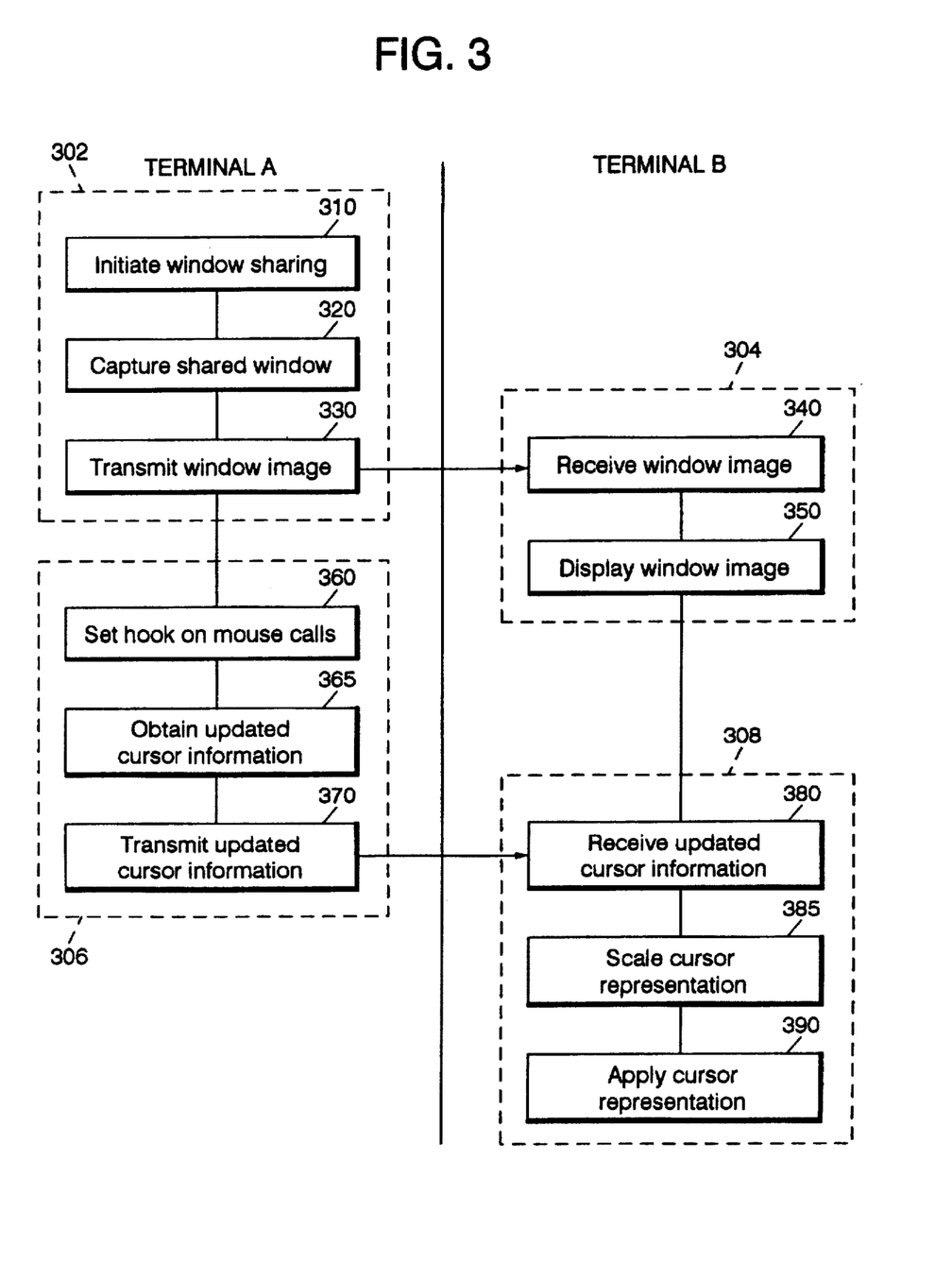
FIG. 3 illustrates the major processes performed by the window sharing software operating on terminals A and terminal B.

The general operation of window sharing is illustrated in FIG. 3, in which a window at terminal A, which we shall designate as the remote terminal, is copied into a window at terminal B, which we shall designate as the local terminal. The overall operation is divided into four main processes. In the first process 302, window sharing is initiated at terminal A (step 310), by launching application WS 216. This application then prompts the user to identify a window, which we shall assume belongs to application App1 215, for example by clicking the mouse on the relevant window. Window sharing application WS 216 then captures the indicated window using conventional techniques to obtain a copy of the data presented therein (step 320). The captured data is then presented to the communications software 220 for transmission in known fashion to terminal B (step 330).

Corresponding to these steps, terminal B performs the steps indicated in process 304, which include the communications software 120 at terminal B receiving the transmitted data from terminal A (step 340). This data is then passed to the Window sharing application WS 116 to be applied to a window at terminal B (step 350). This window may already exist at terminal B, or may be created especially. The window at terminal B may be assigned one of three different classifications:

(a) FULL-SIZE: in this case the window at terminal B will exactly correspond to the window at terminal A, allowing the image data from terminal A to be displayed directly in the window at terminal B;

(b) CLIPPED: in this case the underlying image data from terminal A is effectively displayed at its normal size on terminal B, but the allocated window at terminal B may be altered in size and shape. The effect of this is that some of the underlying image data may be clipped from view; however, it can be inspected by using the normal scrolling commands;

(c) SCALED: in this case the full image from the window at terminal A is scaled so as to fully occupy the window at terminal B, irrespective of the size and shape of this latter window. This involves shrinking or stretching the image received from terminal A independently in the x and y directions as appropriate.

The image can be applied in step 350 using a Windows BitBlt command for a simple copied image. Alternatively, for a scaled window a Windows StretchBlt call can be used, which automatically performs the desired scaling in the X and Y dimensions. This scaling alters the number of pixels in the image from the original value to a new value appropriate to the scaled size of the image.

It will be noted that in the actual implementation the window image data is converted into Device Independent Bit-Map (DIB) format at terminal A prior to transmission, and so at terminal B the call in fact used to display the image is Windows StretchDIBits. The reason for using DIB format is that it overcomes any hardware differences between terminals A and B (eg in relation to the number of supported colours). It would be possible to convert back from DIB format to bit map format at terminal B and then display the bit map directly, and indeed this approach is adopted for the cursor itself (see below). It may also be appropriate to compress the image prior to transmission from terminal A, and then to perform the corresponding decompression on receipt of the image data at terminal B.

For simplicity, we will assume that the window at terminal A is only captured once (ie effectively corresponding to a still image). As will be explained below in more detail, cursor movements at terminal A across this image are then tracked at terminal B. Such an arrangement may be useful for example when the window at terminal A contains a complicated diagram, which the user at A is trying to explain to the user at B (assuming that link 300 in FIG. 2 also provides an audio connection). In the present embodiment WS 216 also provides a refresh facility whereby certain mouse actions by the user at terminal A lead to the window image from terminal A (including any updates that have been applied there) being retransmitted to terminal B. Effectively this corresponds to returning to step 320 in FIG. 3, and repeating the ensuing steps. However, the invention is equally applicable to continuous window sharing systems, in which window updates from terminal A are continuously intercepted and transmitted to terminal B, where they are applied to the mirror window. Such systems could use the approach described in detail in either EPA 590817, or U.S. Pat. No. 5241625 (note that Windows GDI calls are equivalent to the GPI calls for OS/2 in EPA 590817).

Considering now the handling of the cursor itself, this is handled at terminal A by process 306, which first obtains a hook on any mouse movements (step 360). As a result of this hook, updates are received every time the mouse is moved (step 365), and these updates can then be transmitted to terminal B (step 370). The process 308 at terminal B to handle the cursor positioning receives the transmitted cursor information (step 380). The cursor representation is then scaled (step 385), depending on the window in which the cursor is to be displayed, and then the scaled representation is applied (step 390) to the relevant window—ie the window in which the corresponding image is displayed following step 350.

The mouse hook is set up by using the Windows call SetWindowsHookEx, including parameters which identify the type of messages to be intercepted or hooked (in this case mouse messages), the hook procedure which is being used, and the identity of the routine requesting the hook (in this case the window sharing routine WS 216). The use of such hooks is well-known to the skilled person, see for example U.S. Pat. No. 5,241,625 and EPA 590817 previously discussed.

Figure 4:
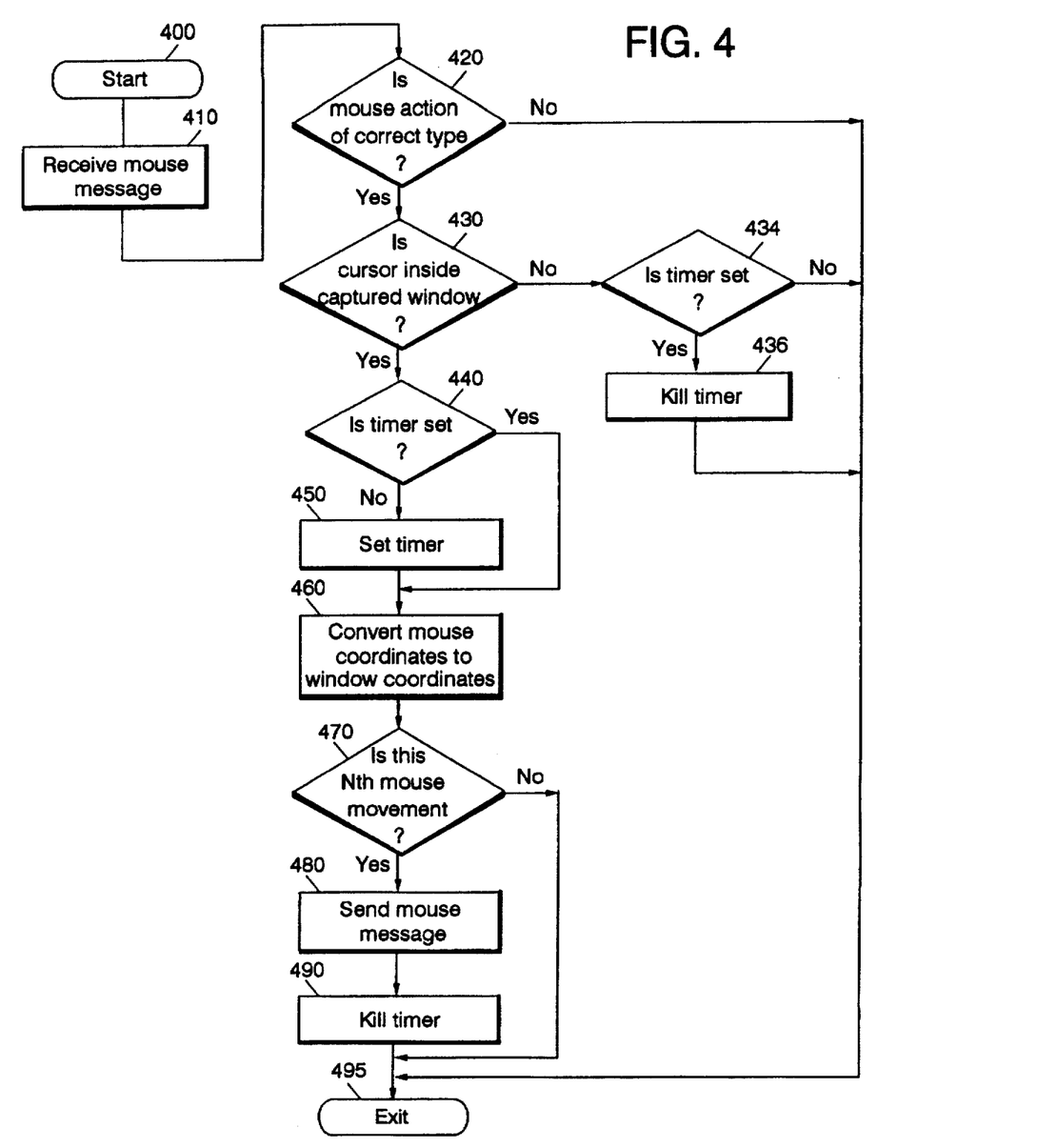
FIG. 4 illustrates the hook procedure used to intercept mouse and cursor commands at terminal A.

The processing performed by the actual hook procedure is illustrated in FIG. 4. This procedure is provided as part of the window sharing application WS 216. However, when the hook is set up (step 360) by the SetWindowsHookEx call, this procedure is passed to the operating system 230. During operation therefore, this procedure logically sits between the device drivers 250 and the operating system 230, intercepting calls between them. When the hook procedure receives such a message (step 410), it first of all checks the type of mouse message (step 420). This is because many mouse messages, such as those concerning clicks of the mouse button, are not relevant to the appearance or position of the mouse. In fact, under the Windows operating system there are only two mouse messages of interest: WM_MOUSEMOVE and WC_NCMOUSEMOVE, which indicate mouse movement in the client and non-client area of a window respectively (the client area of a window is the central image region, whilst the non-client area is the surrounding border containing the action bar, sizing icons, scroll bar etc). All mouse messages other than these two can be ignored.

Providing the mouse action does indicate movement, a check is performed (step 430) to determine whether or not the new mouse position is located within the captured window (ie the window whose image is also being displayed at terminal B). Assuming that this is the case, a test is then performed (step 440) to determine whether or not a timer is set (ie has previously been set and has not since been killed or expired), and if not, the timer is set accordingly (step 450). The purpose of the timer will be described in more detail below. Next, the mouse coordinates are converted from general screen coordinates to window coordinates, ie the position is now specified relative to the captured window itself, rather than the whole screen (step 460). This is because at terminal B, the window image may not be displayed at the same screen location or in the same manner as at terminal A.

A check is then made to see whether the mouse movement is the Nth movement (step 470), and if so, the mouse message is made available for transmission (step 480), and the timer killed (step 490). The reason for the test of step 470 is that in order to reduce network traffic (and also processing load at the workstation), it is desirable to avoid transmitting every mouse movement. Note that if the mouse is slowly moved from position A to position B, this does not result in just a single mouse movement message relating to the new terminal position, but rather a whole succession of mouse messages specifying intermediate positions en route to position B. In the present embodiment N=5, so that only every fifth mouse movement is processed. However, many other values of N could also be used, typically depending on the availability of bandwidth between terminal A and terminal B. Thus if bandwidth is tightly constrained, N might be increased to say 10, so that only every tenth mouse movement is processed, whereas in the absence of bandwidth and other constraints, N might be set equal to unity, so that every mouse single movement would be transmitted to terminal B. Transmitting only some mouse movements may lead to slightly coarser cursor movements at terminal B, but for values of N around 5, the effect is not very significant.

The transmission of only selected cursor updates can lead to a slight problem, in that after an extended movement, the last mouse movement may not have been transmitted (if it was not a fifth movement). This means that the final position of the cursor as displayed at terminal B will not exactly match the true final position of the cursor at terminal A. In order to overcome this problem, a timer routine is used, which is set (step 450) each time a relevant mouse movement message is received, providing the timer has not already been set. The timer is killed to free up resources if a mouse movement is actually made available for transmission (step 490), since in this case terminal B will receive the most up to date mouse location. The timer may also be killed following step 430 if the mouse is located outside the window. Thus a test is made (step 434) to determine whether or not the timer is set, and if so the timer is killed (step 436). This sequence will occur when the mouse is moved from inside the window, when the timer was initiated, to outside the window, when the timer can be killed.

Figures 5, 6:
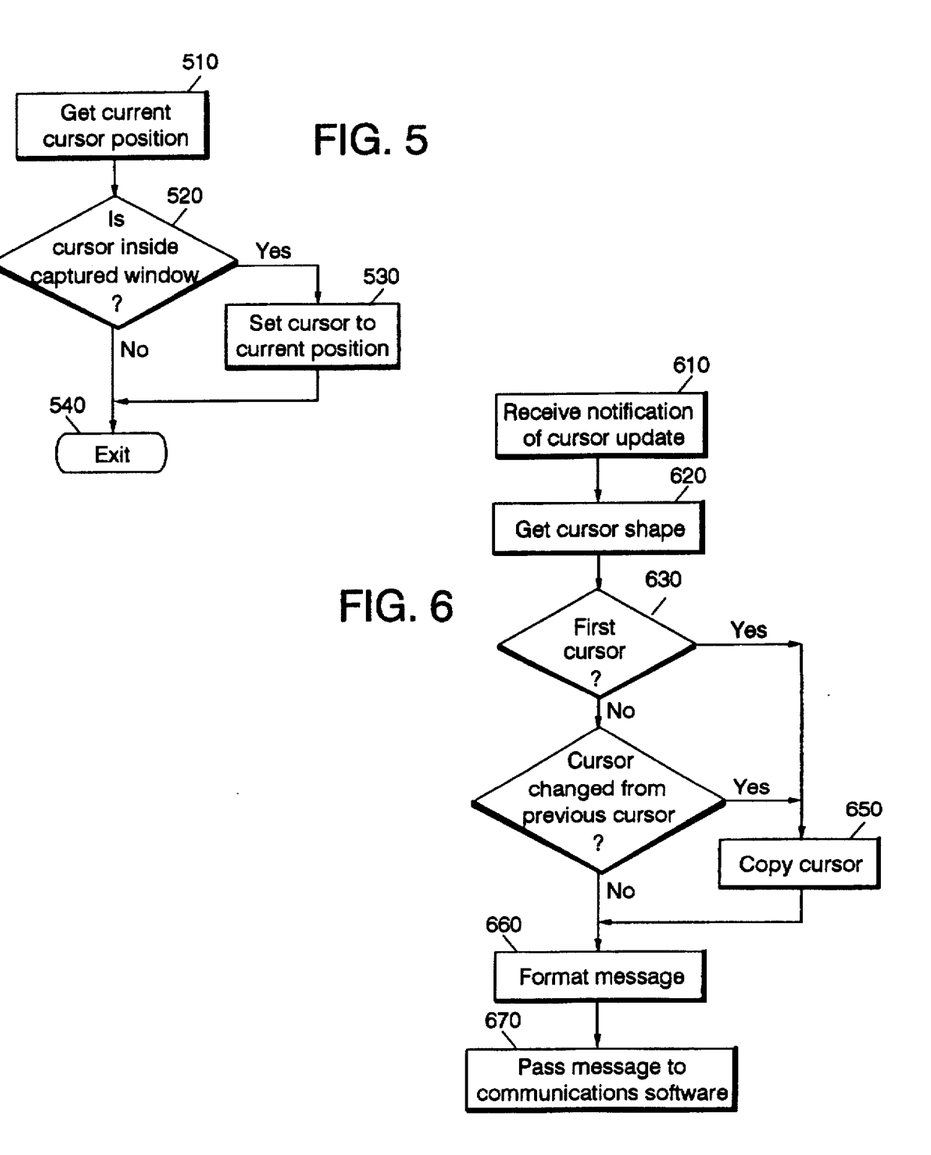
FIG. 5 illustrates the timer procedure used in conjunction with the hook procedure of FIG. 4.
FIG. 6 illustrates the processing performed by the window sharing application at terminal A once a cursor update has been generated to transmit the update to terminal B.

FIG. 5 illustrates the timer procedure; this is the routine that the Windows operating system calls if the timer expires (ie without being killed). The procedure first obtains the current cursor position (step 510) using the Windows GetCursorPos call. Next a test is made (step 520) to determine whether or not the cursor position lies within the window of interest (this is analogous to the test of step 430): if not the cursor position is no longer required and the procedure terminates. However, if the cursor is located within the window of interest, then the cursor position is reset using the Windows call SetCursorPos, to the coordinates determined in step 510.

Of course, resetting the cursor to its immediately preceding position does not result in any visible change at terminal A, but it does lead to a new cursor message which is intercepted by the hook procedure of FIG. 4, and processed as previously described in relation thereto. In particular, the timer is reset at step 450, and a test is performed at step 470 to determine if this is the Nth mouse movement. If so, the final mouse position will be sent (step 480) and the timer killed (step 490); if not, the timer will expire again (assuming no further mouse movements), and the procedure of FIG. 5 will execute again. Thus after the final mouse movement, the timer will be repeatedly reset until mouse message count reaches a value divisible by N, whereupon the final mouse position will be transmitted to terminal B. transmitted. Therefore, the timer can run up to a maximum of five times (for N=5 in the present implementation) before the final position is eventually transmitted, and the process stops. Note that in an alternative implementation it would be possible for the timer procedure to explicitly reset the count of cursor movements. This would ensure that the cursor position generated by the first timer procedure would always be transmitted to terminal B.

The duration of the timer in the present embodiment is set to 200 milliseconds, so that the cursor position is generally never out of date for more than a fraction of a second. This has been found to be acceptable from a usability point of view, without being too demanding in terms of system resources.

It will be noted that if the cursor moves out of the region of interest no further position updates are sent, so at terminal B, the cursor simply remains in its last (transmitted) position. Usually this will be very near the edge of the window. One possible enhancement to this approach might be to determine precisely where the cursor exited the window, and transmit this as a final position to be displayed at terminal B. It will be appreciated however that if the cursor re-enters the window, this will normally be from a quite different position.

FIG. 6 illustrates a procedure which is part of the window sharing application 216, and which receives (step 610) the new cursor information from the hook procedure following step 480 of FIG. 4. Before this can be transmitted, a check needs to be performed that the cursor has not changed shape (the hook procedure does not determine cursor shape). Such a change in cursor shape may have happened for example if the cursor has been removed to the side of a window, where it normally changes from a single headed arrow to a doubly-headed arrow to indicate that window sizing is available.

Unfortunately, the Windows operating system does not provide any specific mechanism to do determine cursor shape, but this can be achieved indirectly by using the SetCursor command. This command allows a new cursor to be set, and also returns a handle to the previous cursor. The handle can then be used to locate the desired information concerning the shape etc of the previous cursor, which is of course the cursor of interest. Tests are then performed to determine whether this is the first cursor representation to be processed (step 630), or whether the cursor representation has changed from the cursor shape last transmitted (step 640). If so, the new cursor representation is copied (step 650) for sending to terminal B, and also stored for use as the previously transmitted cursor when the test of step 640 is performed subsequently. Once this processing has been completed, the cursor can be restored to its original value, using the SetCursor command and the handle to the original cursor obtained from the first SetCursor command.

In the present embodiment, a ShowCursor(FALSE) command is used in conjunction with the first SetCursor, and a ShowCursor(TRUE) command in conjunction with the second SetCursor command. Inbetween these two commands the screen cursor is momemtarily rendered invisible; this is far less obtrusive for the user than any momentary change in cursor shape, which would otherwise be caused by the SetCursor instructions. For this reason, it is therefore immaterial which cursor shape is actually specified in the first SetCursor call. Also, the present embodiment obtains a lock to the cursor handle whilst it is being examined and copied, to avoid another application trying to alter it during this process, the lock being released when the cursor information has been examined and copied.

Next, the information on the new cursor is formatted into a message (step 660). The message contains the new cursor position, and, if applicable, the new cursor image or representation. The message is then passed to the communications software 220 for transmission to terminal B (step 670).

The skilled person will appreciate that as described in the above-mentioned Petzold reference, a cursor actually comprises two separate images (each 32×32 bits in Windows). The first of these is an AND mask, and provides the outline of the cursor image within the 32×32 bit square (eg forms the silhouette of the cursor arrow, or whatever other representation is being used). The second is an XOR mask, and is used to provide detail within the cursor image itself. A cursor also has a specific hotspot, which is a single position within the 32×32 bit image (eg the tip of the cursor arrow). If the cursor is used to select a position, then the position corresponding exactly to the hotspot is selected. Thus whenever a new cursor representation is detected, obtained from the operating system, and transmitted from terminal A to terminal B, this representation includes both the AND and XOR masks, and also the coordinates of the hotspot for the new representation.

Figure 7:
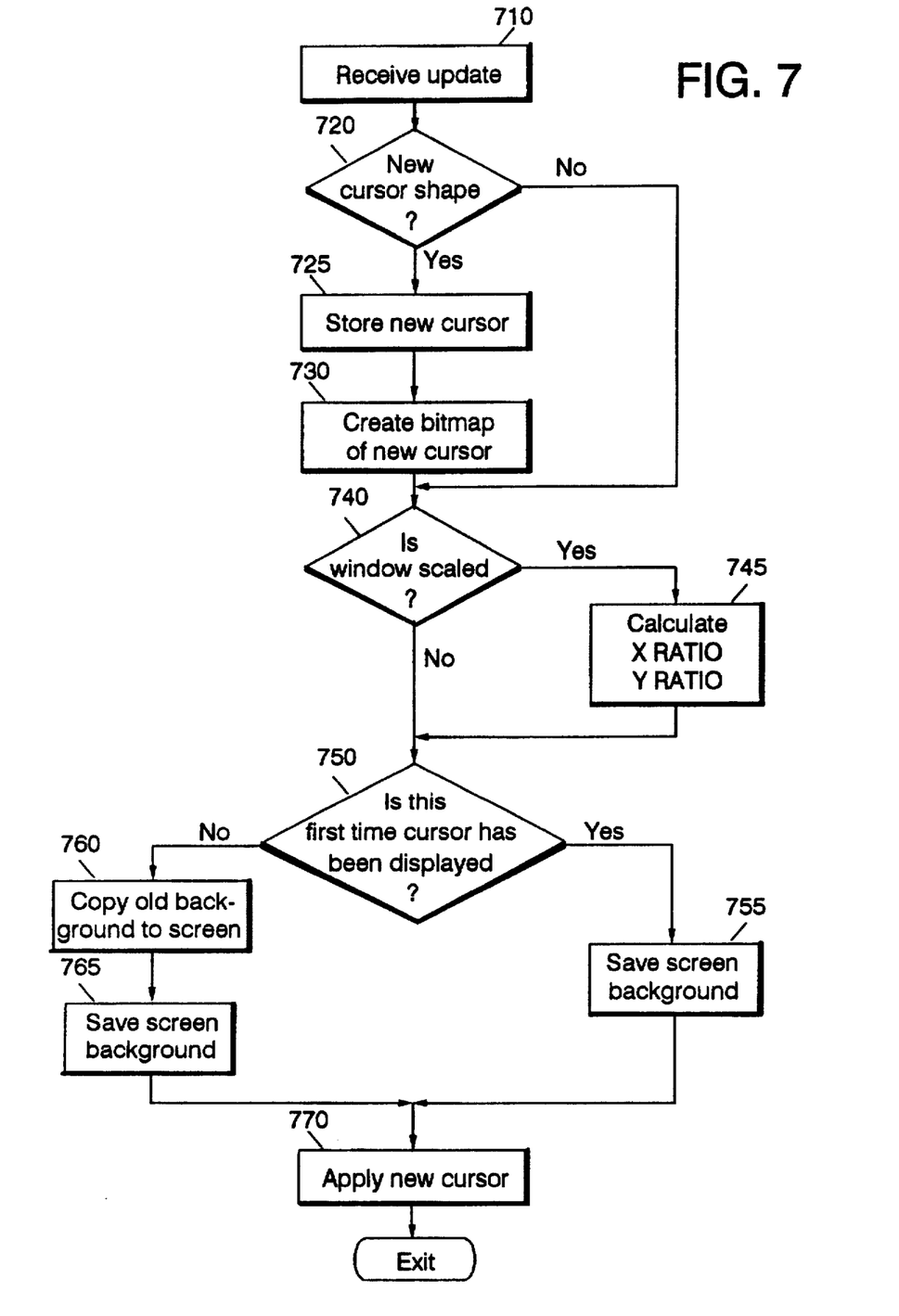
FIG. 7 illustrates the processing performed by the window sharing application at terminal B to display the image of the remote cursor.

The processing at the terminal B which corresponds to that at terminal A is illustrated in FIG. 7. The processing commences with the receipt at terminal B of a cursor update from terminal A (step 710). An examination is then made (step 720) of the received data to determine whether or not the message contains a new cursor shape. This will be the case for the first cursor transmission, and also for any subsequent transmissions for which the cursor has changed shape. If there is a new cursor shape, then the new shape is stored (step 725), and a bit map formed corresponding to the new cursor shape (step 730). In fact to be precise there will be two bit maps, one for the cursor AND mask and one for the cursor XOR mask. This latter step is performed by means of the Windows CreateBitMap call, and allows the cursor image to then be directly applied to the screen by means of a Windows StretchBlt or BltBit call.

Next a test is made to determine the display classification (step 740). As explained above, there are various types of classification supported by window sharing applications 116, 216, one of which permits scaling of the display window with respect to the original window. In this case, the values of XRATIO and YRATIO are calculated (step 745), which represent the relative size in the x and y dimensions respectively of the display window with respect to the original window. Note that under Windows and other similar operating systems, it is possible to independently vary the width and height of a window (ie the x and y dimensions). XRATIO and YRATIO are calculated from (i) the size of the original window, which was supplied when the window image was transmitted from terminal A to terminal B in step 330, and (ii) the size of the currently displayed window, which is determined when the window is first displayed at terminal B in step 350, and then updated if the window is subsequently resized. Note that if the window is not a scaled window, then XRATIO and YRATIO can be regarded as unity.

A test is then performed (step 750) to determine whether this is the first time that the cursor has been displayed. If so, then the portion of the image where the cursor is to be positioned is saved into memory, together with its location. For the standard 32×32 bit Windows cursor, this requires copying a portion of the image having a size of (32.XRATIO)×(32.YRATIO). In Windows this can be simply performed using either a BitBlt or StretchBlt call. The reason for saving this portion of the image is that when the cursor moves, this bit of image can be restored to its original form. This is indeed what happens if the test of step 750 produces a negative result—ie this is not the first time that this cursor has been displayed. In this case the first action is to copy the saved portion of image back to its original position in the window, again using the Windows BitBlt or StretchBlt call (step 760). This effectively deletes or obliterates the cursor from its now out of date position. Next the portion of the window corresponding to the updated position of the cursor is saved to memory (step 765), in exactly the same manner as for step 755, replacing any previously stored image portion.

Note that if the window image is updated at any stage, for example because a refreshed window image is transmitted from terminal A to terminal B for display, then the saved portion of image is no longer valid. Thus whenever the display window image is refreshed, the flag indicating whether or not this is the first time the cursor has been displayed is reset. The test of step 750 will then produce a positive result, going straight to step 755, and the outdated saved image portion will be deleted without first being re-displayed.

Finally, once the relevant portion of the screen has been saved, the updated cursor image can itself be applied (step 770), using the cursor bit map created in step 730. This is performed by means of the Windows StretchBlt call, which takes the standard 32×32 bit cursor bit map, the new cursor location on the screen, and the values of XRATIO and YRATIO, and then scales the cursor bit map by the specified values of XRATIO and YRATIO before applying the cursor to the displayed window. The StretchBlt call therefore effectively performs both a scaling operation followed by an image display operation. Again, it will be appreciated by those skilled in the art that this StretchBlt call is actually performed twice, firstly to impose the cursor AND mask on the screen, and then to apply the cursor XOR mask.

Note that for the StretchBlt call, we need to supply the location of the corner or origin of the cursor bitap within the target window. This can be obtained by subtracting the position of the cursor hotspot in the cursor bit map (supplied as part of the cursor representation) from the position of the cursor hotspot relative to the window (which is originally supplied in terms of screen coordinates by the hook procedure and then transformed to window coordinates in step 460). These values then need to be scaled in accordance with the window size (ie using XRATIO and YRATIO). In fact, the cursor position within the target window will already have been calculated using this method for step 765, to allow the portion of image located underneath the new cursor position to be saved.

Figure 8A:
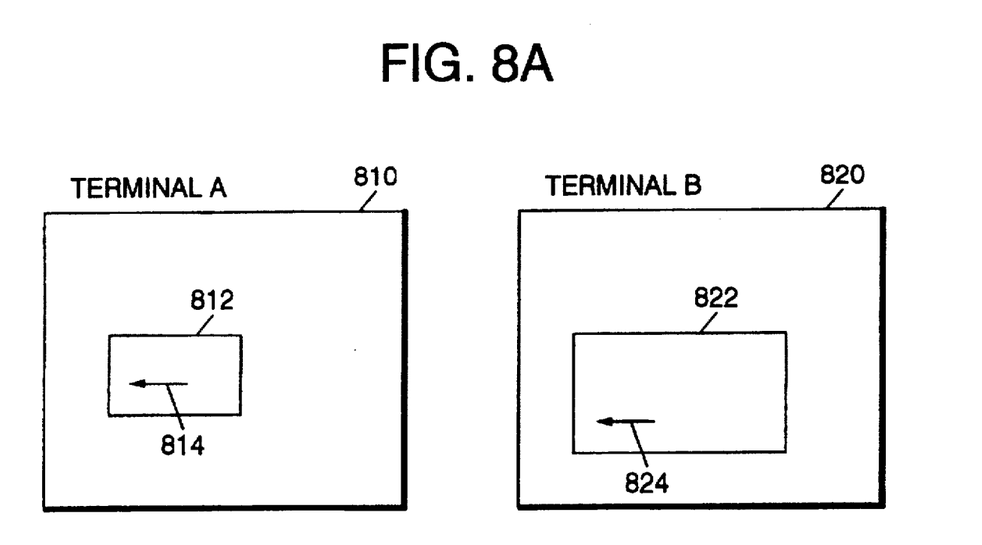
FIGS. 8A and 8B illustrate the sizing of the cursor image.

FIG. 8 provides an illustration of the operation of the above method. In FIG. 8A a window 812 on a screen 810 at terminal A is copied into a window 822 on screen 820 at terminal B. Window 822 provides a scaled representation of window 812, as previously defined. Likewise the cursor 814 from terminal A appears as cursor 824 within window 822 at terminal B (normally such a cursor would oriented diagonally, but is shown here as a horizontal arrow for ease of representation). The position of cursor 824 relative to window 822 matches the position of cursor 814 relative to window 812, despite the fact that window 822 has a different screen position from window 812. Window 822 is enlarged with respect to window 812, but has the same aspect ratio. Likewise, cursor 824 is enlarged with respect to cursor 814, but again has the same aspect ratio.

Figure 8B:
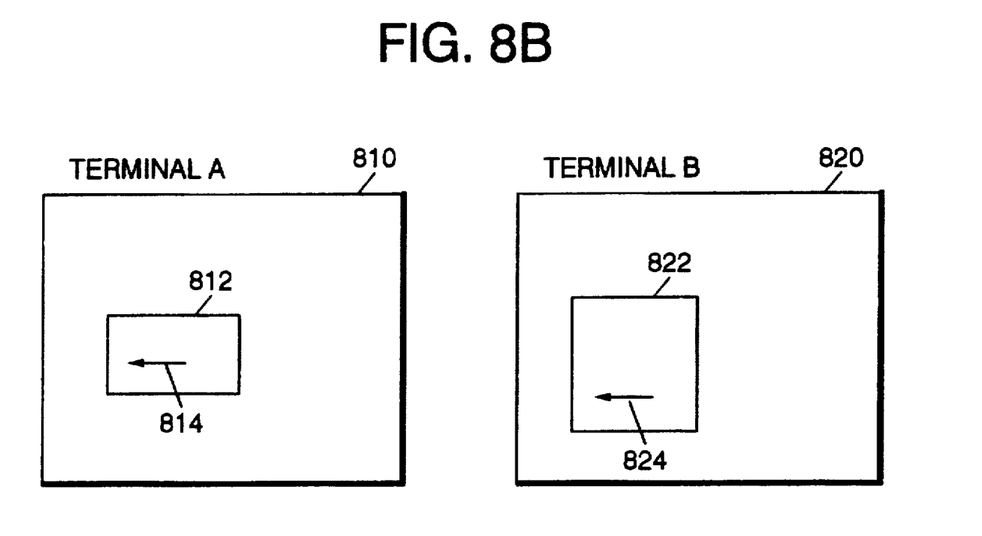

Referring now to FIG. 8B, window 822 has been resized to reduce its width or X dimension. As a result of this cursor 824 has likewise been reduced in width. Thus it can be seen that the size and shape of cursor 824 at terminal B relative to window 822 is the same as the size and shape of cursor 814 at terminal A relative to window 812. The processing behind this adjustment is as follows. In response to the re-sizing operation, and prompted by the Windows operating system, the image is re-drawn into the resized window (corresponding to step 350), in accordance with well-known techniques. Following such re-sizing, the cursor display process shown in FIG. 7 is then called. Steps 710 to step 730 are effectively dropped through as not applicable. Next comes test 740, which will produce a positive result since window 822 is scaled, leading to XRATIO and YRATIO being recalculated (step 745). The cursor is then subsequently redrawn (step 770), scaled in accordance with these new values of XRATIO and YRATIO, as illustrated in FIG. 8B.

Note that in the present implementation, no action occurs if window 812 is resized at terminal A. However, the user does have the option of then refreshing the image, so that the newly sized image is transmitted from terminal A to terminal B for display. When the cursor is next moved and the update transmitted to terminal B, this then picks up the new window size and the cursor is redisplayed in its new sizing, corresponding to the new window/cursor ratio at terminal A. Of course, this behaviour could be modified, for example so that any image refresh automatically generated an updated cursor position being transmitted, and/or so that any image re-sizing at terminal A automatically generated an image refresh.

It will be appreciated that cursor 824 is only a cursor image, displaying the cursor position at remote terminal A, and does not represent a true cursor at terminal B. Thus the cursor image 824 is combined with the main window image, rather than having its own separate plane (hence the need to save and then restore the portion of the window image underneath the cursor image in steps 755 to 765). It does not function as an actual cursor at terminal B; it is not under mouse control and cannot be used to indicate positions to the operating system. Indeed, terminal B will have its own separate cursor (not shown) for performing such functions.

It has been found that the approach described above of matching the cursor size in the windows at both terminals provides a more natural and intuitive user interface. The technique is generally applicable whenever an image is shared across two or more workstations, for example, during a presentation, shared editing, remote control, or any other such activity. It should be noted that whilst the window sharing facility has been described primarily with reference to two terminals (known as "point to point"), the present implementation in fact allows the shared window to be viewed from multiple other terminals (referred to as "multipoint"). The extension from point to point to multipoint is primarily performed by the communications is software which directs the cursor update information to multiple other terminals.

Although the present invention has been described with respect to a specific preferred embodiment thereof, various changes and modifications may be suggested to one skilled in the art, and it is intended that the present invention encompass such changes and modifications as fall within the scope of the appended claims.

I claim:

1. A method of operating a local computer workstation (100), linked to a remote computer workstation (200), wherein an image which is displayed at the remote workstation is also displayed at the local workstation, the remote workstation supporting a cursor which is movable across the image, the method comprising the steps, performed by the local workstation, of:

receiving (380) information from the remote workstation indicating the cursor position relative to the image at the remote workstation;

scaling (385) a cursor representation at the local workstation in accordance with the ratio of the sizes of the image as displayed at the local and remote workstations; and applying (390) the scaled cursor representation to its indicated position in the image at the local workstation.

2. The method of claim 1, further comprising the step of, for each updated cursor position received, deleting the cursor representation from its former position in the image at the local workstation.

3. The method of claim 2, further comprising the step of, prior to applying the cursor representation to its updated position, saving (765) a portion of the image corresponding to the updated position, and on receipt of the next updated cursor position, deleting the cursor representation from this position by re-applying (760) the saved portion of the image to its original position.

4. The method of claim 1, in which the image comprises a rectangular window.

5. The method of claim 4, in which the scaling is done independently in the x and y directions.

6. The method of claim 1, further comprising the step of receiving at the local workstation from the remote workstation a representation of the cursor at the remote workstation, and using this received representation as the basis for the cursor representation at the local workstation.

7. The method of claim 6, further comprising the step of generating (730) from the received cursor representation a bit map for use as the cursor representation at the local workstation.

8. The method of claim 1, further comprising the steps of detecting that the image at the local workstation has been re-sized;

re-scaling the cursor representation at the local workstation in accordance with re-sized image; and applying the re-scaled cursor representation to the image at the local workstation.

9. A computer workstation, which in operation may be linked to a remote computer workstation, such that an image which is displayed at the remote workstation is also displayed at the workstation, the remote workstation supporting a cursor which is movable across the image, said workstation including:

means for receiving information from the remote workstation indicating the cursor position relative to the image at the remote workstation;

means for scaling a cursor representation in accordance with the ratio of the size of the image displayed at the workstation to the size of the image displayed at the remote workstation; and means for applying the scaled cursor representation to its indicated position in the image.

10. The workstation of claim 9, further including means, responsive to each updated cursor position received, for deleting the cursor representation from its former position in the image at the local workstation.

11. The workstation of claim 10, further including means for saving a portion of the image corresponding to the updated position of a cursor, and wherein said deleting means are responsive to the receipt of the next updated cursor position, to delete the cursor representation from this position by re-applying the saved portion of the image to its original position.

12. The workstation of claim 9, in which the image comprises a rectangular window.

13. The workstation of claim 9 further including means for receiving from the remote workstation a representation of the cursor at the remote workstation, and using this representation as the basis for the cursor representation at the local workstation.

14. The workstation of any of claim 9 further including means for detecting that the image at the local workstation has been re-sized; means for re-scaling the cursor representation in accordance with re-sized image; and means for applying the re-scaled cursor representation to the image.

15. A method of operating a local and a remote computer workstation, said local and remote computer workstations being connected by a communications link, wherein an image which is displayed at the remote workstation is also displayed at the local workstation, the remote workstation supporting a cursor which is movable across the image, the method comprising the steps of:

transmitting information from the remote workstation to the local workstation indicating the cursor position relative to the image at the remote workstation;

scaling a cursor representation at the local workstation in accordance with the ratio of the sizes of the image as displayed at the local and remote workstations; and     applying the scaled cursor representation to its indicated position in the image at the local workstation.

16. The method of claim 15, further comprising the step of transmitting from the remote workstation to the local workstation a representation of the cursor at the remote workstation, and using this transmitted representation as the basis for the cursor representation at the local workstation.

17. The method of claim 16, further comprising the step of detecting a change of cursor image at the remote workstation, and transmitting a representation of the changed cursor image from the remote workstation to the local workstation.

18. The method of any of claim 15, wherein only every Nth detected change in cursor position is transmitted from the remote workstation to the local workstation, where N is an integer greater than unity.

19. The method of claim 18, further comprising the steps of:

starting a timer if a cursor position change is detected;

killing the timer if the cursor position change is transmitted; and     transmitting the current cursor position if the timer expires.

* * * * *